(12) United States Patent
Chen

(10) Patent No.: US 7,044,564 B2
(45) Date of Patent: May 16, 2006

(54) REAR HUB FOR BICYCLE

(76) Inventor: Tao Chen, No. 108, QianJinZhong Road, Kun Shan City, Jiangsu Province (CN)

( * ) Notice: Subject to any disclaimer, the term of this patent is extended or adjusted under 35 U.S.C. 154(b) by 118 days.

(21) Appl. No.: 10/764,464

(22) Filed: Jan. 27, 2004

(65) Prior Publication Data

US 2004/0183361 A1    Sep. 23, 2004

(30) Foreign Application Priority Data

Feb. 17, 2003  (JP) .............................. 2003-038284

(51) Int. Cl.
*B60B 27/00* (2006.01)

(52) U.S. Cl. ...................... 301/110.5; 192/64
(58) Field of Classification Search ............. 301/110.5, 301/110.6, 59, 124.2; 192/64, 54.2, 69.4
See application file for complete search history.

(56) References Cited

U.S. PATENT DOCUMENTS

| | | | | |
|---|---|---|---|---|
| 1,603,596 A | * | 10/1926 | Harley | ........................ 384/480 |
| 1,693,596 A | | 10/1926 | Harley | |
| 2,049,972 A | * | 8/1936 | Murden | .................... 192/217.6 |
| 2,394,112 A | | 2/1946 | Schwinn | |
| 4,116,319 A | | 9/1978 | Nagano et al. | |
| 4,278,265 A | | 7/1981 | Nagano | |
| 4,429,448 A | | 2/1984 | Butz | |
| 4,567,973 A | * | 2/1986 | Butz | ........................... 192/64 |
| 4,580,670 A | * | 4/1986 | Nagano | ........................ 192/64 |
| 5,531,510 A | * | 7/1996 | Yamane | .................... 301/110.5 |
| 5,632,364 A | * | 5/1997 | Mercat | .......................... 192/64 |
| 6,202,813 B1 | * | 3/2001 | Yahata et al. | .................. 192/64 |
| 6,322,155 B1 | * | 11/2001 | Chen | ........................ 301/110.5 |
| 6,511,133 B1 | * | 1/2003 | Tabe | ............................ 301/59 |

FOREIGN PATENT DOCUMENTS

| | | | |
|---|---|---|---|
| EP | 0277576 | * | 1/1988 |
| EP | 0834-450 A1 | | 2/1998 |
| FR | 2317108 A | | 2/1977 |
| JP | 55-106801 | * | 8/1980 |
| JP | 56-135301 | * | 10/1981 |
| JP | 56-135301 A | | 10/1981 |
| JP | 58-161601 | * | 9/1983 |

* cited by examiner

*Primary Examiner*—Russell D. Stormer
(74) *Attorney, Agent, or Firm*—Shinjyu Global IP Counselors, LLP

(57) ABSTRACT

A bicycle rear hub is configured to improve the external appearance and the resistant to corrosion of a drive body. The rear hub also has a hub shaft, a hub shell, a pair of bearing units, a one-way clutch, a sprocket, and a cover member. The hub shell is rotatably mounted to the hub shaft by the bearing units. The drive body is mounted to one end of the hub shell by the one-way clutch that transmits rotation from the drive body to the hub shell in one direction. The sprocket is fixedly mounted to a radially outward-facing surface of the drive body. The cover member is mounted to the drive body 19 to cover the radially outward-facing surface of the drive body and with its tip edge contacting the outside lateral surface of the sprocket.

20 Claims, 5 Drawing Sheets

REAR HUB FOR BICYCLE

BACKGROUND OF THE INVENTION

1. Field of the Invention

The present invention relates to a bicycle rear hub mounted to a rear part of a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the rear hub of the bicycle.

The rear hubs of bicycles, particularly the rear hubs used on "light roadster" bicycles in which the sprocket is mounted such that it can be detached and reattached freely, are generally provided with the following: a hub shaft mounted in a non-rotatable manner to a rear part of the bicycle frame; a hub shell mounted in a freely rotatable manner to the hub shaft; a drive body mounted in a freely rotatable manner to one end of the hub shell; a one-way clutch arranged between the drive body and the hub shell and configured to transmit rotation from the drive body to the hub shell in one direction; and a sprocket mounted to a radially outward-facing surface of the drive body such that it can neither rotate nor move axially with respect to the drive body.

Axially-extending interlock grooves for mounting the sprocket in a non-rotational manner are arranged in the radially outward-facing surface of the drive body with circumferential spacing there-between. The sprocket is prevented from coming out of place by an annular spring member mounted to the radially outward-facing surface of the drive body. The spring member is made of a piece of elastic steel wire curved into a C shape and mounted into an annular groove formed in the radially outward-facing surface of the drive body. A seal member for preventing contaminants from invading the bearing unit is provided between the drive body and the bearing unit.

In the conventional arrangement just described, axially-extending interlock grooves are formed in the radially outward-facing surface of the drive body and an annular groove is also formed in the surface and installed with a spring member. With a plurality of groves formed and a spring member mounted in its radially outward-facing surface, the external appearance of the drive body is unattractive. Also, since the radially outward-facing surface is exposed, there is the risk that in some environments the drive body and the spring member mounted thereto will corrode.

In view of the above, it will be apparent to those skilled in the art from this disclosure that there exists a need for an improved rear hub. This invention addresses this need in the art as well as other needs, which will become apparent to those skilled in the art from this disclosure.

SUMMARY OF THE INVENTION

Regarding bicycle rear hubs, the object of the present invention is to improve the external appearance of the drive body and make the drive body more resistant to corrosion.

In accordance with a first aspect of the present invention, a bicycle rear hub that is mounted to a rear part of a bicycle frame. The bicycle rear hub basically comprises a hub shaft, a hub shell, first and second bearing units, a drive body, a one-way clutch, a sprocket, and a cover member. The hub shaft is configured and arranged to be non-rotatably mounted to a rear part of a bicycle frame. The hub shell is mounted in a freely rotatable manner to the hub shaft. The first and second bearing units are arranged between the hub shaft and opposite ends of the hub shell. The drive body is mounted in a freely rotatable manner to one end of the hub shell. The one-way clutch is arranged between the drive body and the hub shell and configured to transmit rotation from the drive body to the hub shell in one direction. The sprocket is fixedly mounted to the radially outward-facing surface of the drive body such that it can neither rotate nor move axially relative to the drive body. The cover member is mounted to the drive body to overlie the radially outward-facing surface of the drive body with a tip edge of the cover member contacting an outside lateral surface of the sprocket.

With this rear hub, when the rotation of the crank is transmitted to the sprocket through the chain, the drive body rotates and transmits the rotation to the hub shell through the one-way clutch, thereby rotating the rear wheel. The radially outward-facing surface of the drive body is covered by the cover member, whose tip edge contacts the outside lateral surface of the sprocket. Members and structures for mounting a sprocket are generally provided on the radially outward-facing surface of the drive body. For example, axially oriented grooves for mounting the sprocket in a non-rotatable manner and an annular groove for mounting the sprocket such that it cannot move axially are provided. The annular groove has, for example, a spring member installed therein and the spring member prevents the sprocket from moving in the axial direction. The cover member is mounted to the radially outward-facing surface of the drive body such that it covers the radially outward-facing surface of the drive body and its tip edge contacts the outside lateral surface of the sprocket. Consequently, since the radially outward-facing surface of the drive body is not exposed, the external appearance of the drive body is improved and the drive body is more resistant to corrosion.

In accordance with a second aspect of the present invention, the bicycle rear hub of the first aspect of the present invention is configured such that the cover member has a cylindrical part covering the radially outward-facing surface of the drive body and an enlarged diameter part extending from the cylindrical part to contact the sprocket with the tip edge of the cover member. With this rear hub, the cover member can more easily cover members that are mounted to the rotationally outward-facing surface of the drive body and protrude from said surface because the portion of the cover member that contacts the sprocket is larger in diameter than the cylindrical part of the cover member.

In accordance with a third aspect of the present invention, the bicycle rear hub of the first and/or second aspects of the present invention is configured such that sprocket is retained on the radially outward-facing surface of the drive body by a ring-shaped spring member that restricts axial movement of the sprocket, and the cover member is configured and arranged to cover a radially outward-facing side of the spring member. With this rear hub, since the spring member is covered by the cover member, the spring member is not exposed and does not easily corrode in cases where a spring member is used to restrict the axial movement of the sprocket.

In accordance with a fourth aspect of the present invention, the bicycle rear hub in any one of the first through third aspects of the present invention is configured such that the first bearing unit has a first ball pushing member fastened to the hub shaft by screw threads, a first ball bearing member mounted in a non-rotatable manner to one end of the hub shell, and a plurality of spherical bodies arranged between the first ball pushing member and the first ball bearing member; and further comprising a seal member disposed to seal a gap formed between a radially inward-facing surface of the drive body and a radially outward-facing surface of the first ball pushing member of the first bearing unit. With this rear hub, since the seal member covers the axially outward-facing side of the first bearing, it is difficult for liquids, dust, and other contaminants to enter the first bearing and the service life of the first bearing is extended.

In accordance with a fifth aspect of the present invention, the bicycle rear hub in any one of the first through fourth aspects of the present invention is configured such that the cover member is further provided with a flange part that extends radially inward from a base end of the cylindrical part. With this rear hub, the flange part protects the end face of the drive body and can also protect the seal member, for example, when a seal member is mounted to the axially outward-facing side of the first bearing.

In accordance with a sixth aspect of the present invention, the bicycle rear hub in any one of the first through fifth aspects of the present invention is configured such that the cover member is elastically interlocked with the radially outward-facing surface of the drive body. With this rear hub, the cover member can be mounted with ease because the cover member interlocks elastically with the radially outward-facing surface of the drive body.

In accordance with a seventh aspect of the present invention, the bicycle rear hub of the sixth aspect of the present invention is configured such that the drive body includes an annular depression formed in the radially outward-facing surface of the drive body; and the cover member includes a mating protrusion extending radially inward and meshing with the annular depression to elastically interlock the cover member with the radially outward-facing surface of the drive body. With this rear hub, the interlocking structure of the cover member can simplified because the cover member is interlocked by the mating of a protrusion and a depression.

In accordance with an eighth aspect of the present invention, the bicycle rear hub in any one of the first through seventh aspects of the present invention is configured such that the cover member is a one-piece, unitary member that is constructed of an elastomeric material.

With the present invention, a cover member is mounted to the radially outward-facing surface of the drive body such that it covers the radially outward-facing surface of the drive body and its tip edge contacts the outside lateral surface of the sprocket. Consequently, since the radially outward-facing surface of the drive body is not exposed, the external appearance of the drive body is improved and the drive body is more resistant to corrosion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
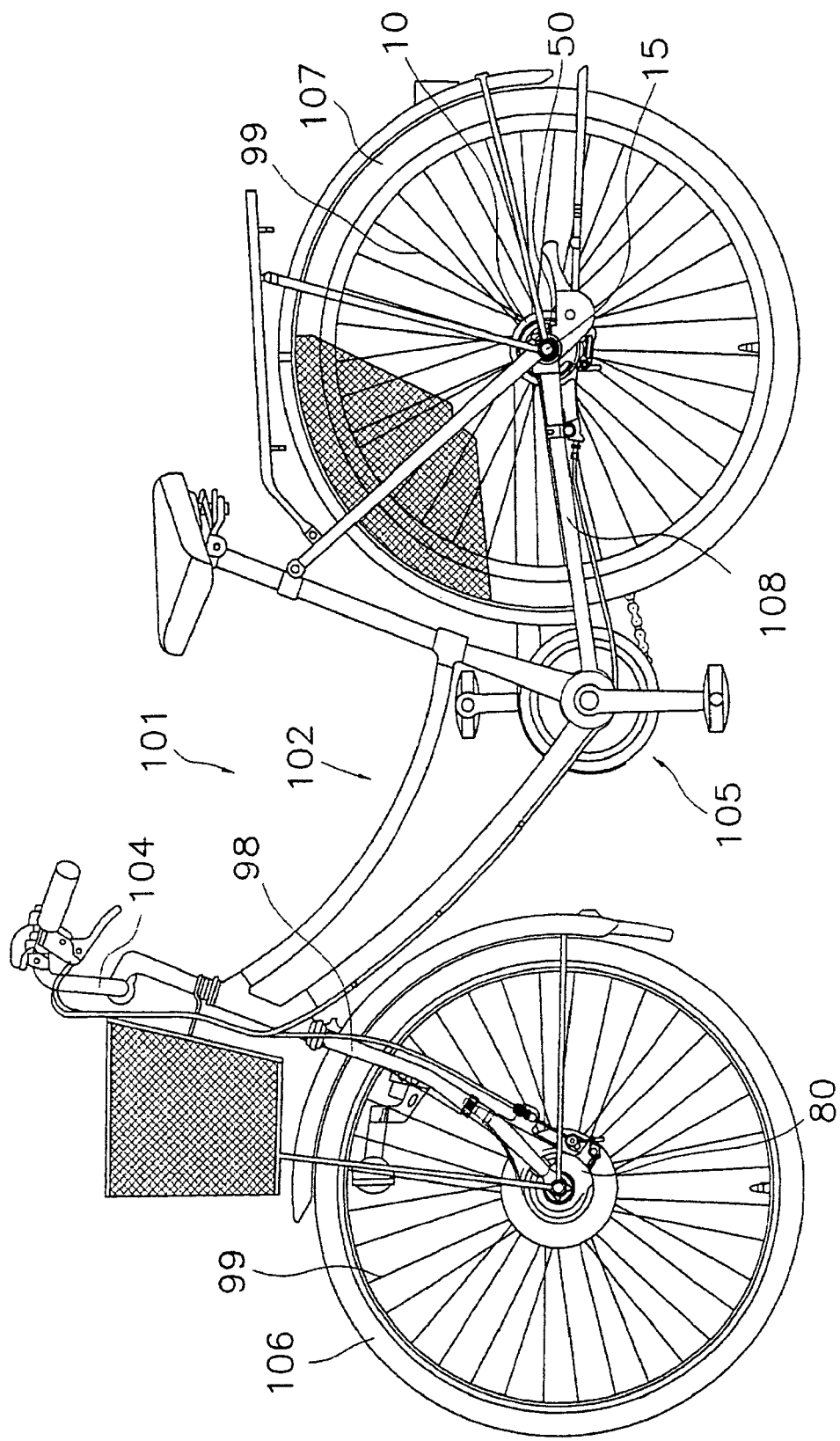
FIG. 1 is a side elevational view of a bicycle equipped with a rear hub in accordance with one embodiment of the present invention.

Referring initially to FIG. 1, a bicycle 101 is illustrated that is equipped with a rear hub 10 in accordance with one embodiment of the present invention. As seen in FIG. 1, the bicycle 101 basically includes a frame 102 that includes a front fork 98; a handle bar 104 that is fixed to the front fork 98; a drive section 105 comprising a chain, pedals, etc.; and front and rear wheels 106 and 107 having spokes 99. The front and rear wheels 106 and 107 are mounted to the front and rear of the frame 102. The rear wheel 107 is mounted to a chain stay 108 provided on a rear part of the frame 102.

Figure 2:
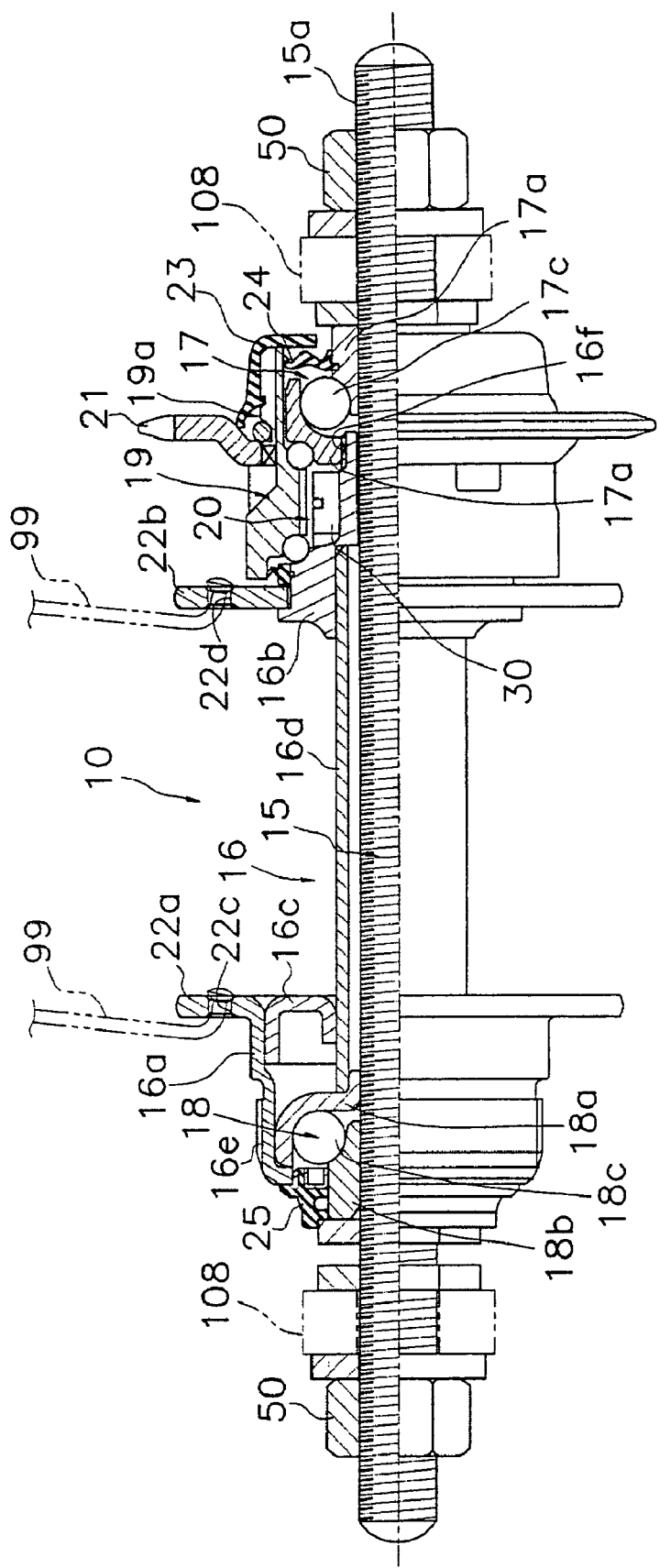
FIG. 2 is a partial cross sectional view of the rear hub in accordance with the illustrated embodiment of the present invention.

In FIGS. 1 and 2, the rear hub 10 is provided on the rear wheel 107 of the bicycle. Both ends of a hub shaft 15 (discussed later) are fastened to the chain stay 108 of the frame 102 with screw-threaded nuts 50 and the spokes 99 are hooked onto two hub flanges 22a and 22b (discussed later).

As shown in FIG. 2, the rear hub 10 is mounted to the rear end of the chain stay 108 along with the rear wheel 107 of the bicycle. The rear hub 10 basically comprises a hub shaft 15, a hub shell 16, first and second bearing units 17 and 18, a drive body 19, a one-way clutch 20, a sprocket 21, and a cover member 23. The hub shaft 15 is mounted in a non-rotatable manner to the rear end of the chain stay 108. The hub shell 16 is mounted in a freely rotatable manner on the outside of the hub shaft 15. The first and second bearing units 17 and 18 are arranged between the hub shaft 15 and both ends of the hub shell 16. The drive body 19 is mounted in a freely rotatable manner to one end of the hub shell 16. The one-way clutch 20 is arranged between the drive body 19 and the hub shell 16 and configured to transmit rotation from the drive body 19 to the hub shell 16 in one direction. The sprocket 21 is mounted to a radially outward-facing surface 19a of the drive body 19 such that it can neither rotate nor move axially relative to the drive body 19. The cover member 23 is mounted to the drive body 19 such that it covers the radially outward-facing surface 19a of the drive body and its tip edge contacts the outside lateral surface of the sprocket 21.

The hub shaft 15 is preferably a rod-shaped member having external screw threads 15a formed over its entire length and is fixed at both ends to the rear end portion of the chain stay 18 with nuts 50.

The hub shell 16 basically includes a left main body part 16a formed integrally with the left hub flange 22a, a right main body part 16b formed integrally with the right hub flange 22b, a left connecting part 16c fixed to the radially inward-facing surface of the left main body part 16a, and a cylindrical linking part 16d that links the left connecting part 16c to the right main body part 16b.

The left main body part 16a is a multi-diameter cylindrical member that is step-shaped and made by press forming steel sheet material. A brake mounting part 16e is provided on the radially outward-facing surface of left main body part 16a near the end thereof for mounting a band brake or other brake device.

The right main body part 16b is a multi-diameter cylindrical member made by machining. The right hub flange 22b is press fitted in a non-rotatable manner to the radially outward facing surface of the large-diameter side of the right main body part 16b. Several ratchet claws 30 constituting the one-way clutch 20 are mounted on the small-diameter side of the right main body part 16b such that they can rise and fall freely. The first ball bearing member 17a of the first bearing unit 17 is connected in a non-rotatable manner to the radially outward-facing surface 16f, which is located at the tip end of the small-diameter side of the right main body part 16b.

The left connecting part 16c has a double cylindrical form with a C-shaped cross section and is made by press forming steel sheet material. The left main body part 16a is fixed to the outside of the left connecting part 16c in a non-rotatable manner and the linking part 16d is fixed to the inside of the left connecting part 16c in a non-rotatable manner. The linking part 16d is a cylindrical member arranged coaxially with respect to the hub shaft 15.

The two hub flanges 22a and 22b are each provided with, for example, 36 spoke hooking holes 22c and 22d arranged circumferentially with equal spacing there-between. The spoke hooking holes 22c are offset relative to the spoke hooking holes 22d by one-half of the pitch in the circumferential direction.

Figure 3:
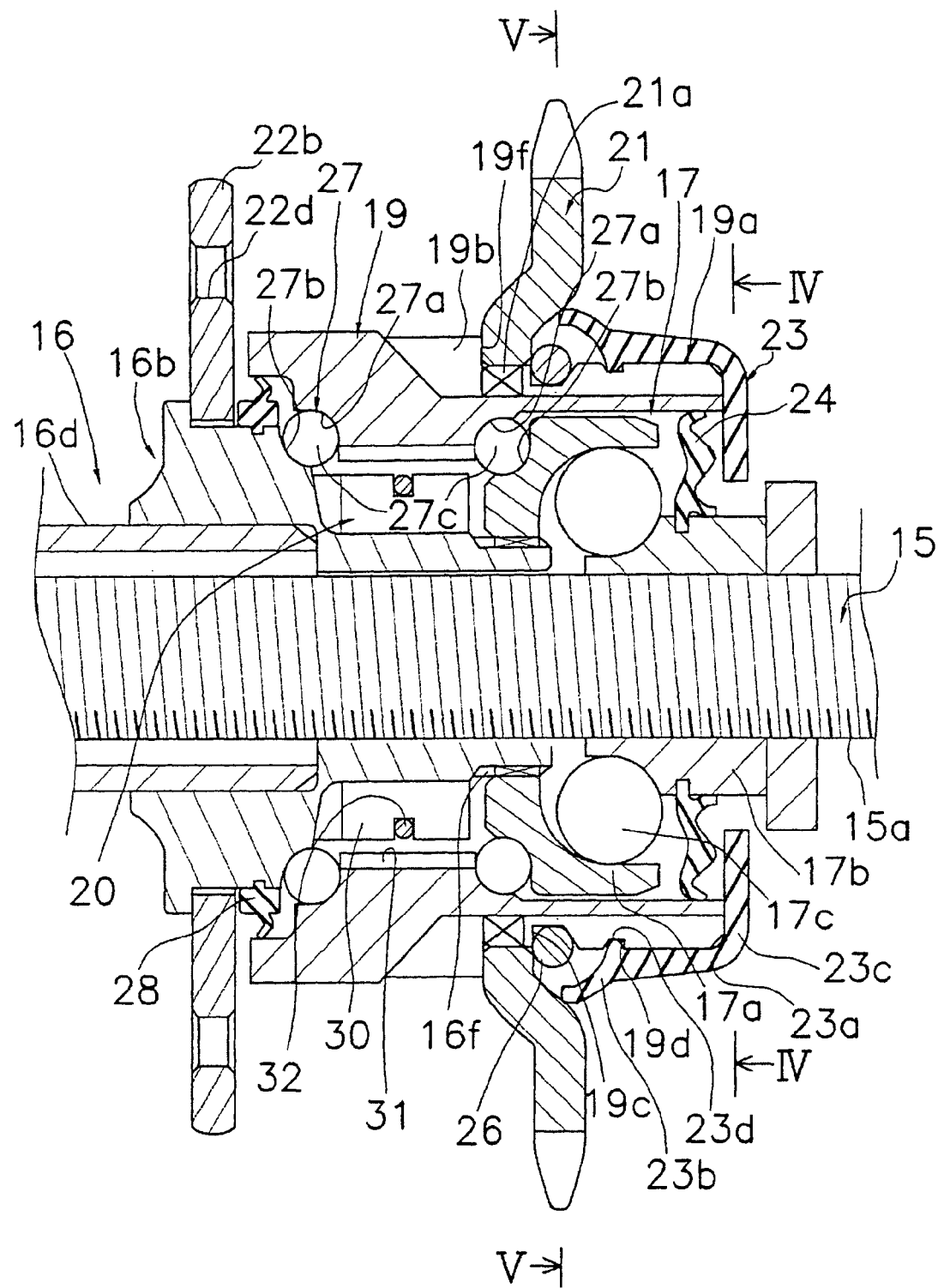
FIG. 3 is an enlarged partial cross sectional view of the right-hand portion of the rear hub illustrated in FIG. 2 in accordance with the present invention.

The first bearing unit 17 is arranged on the right end of the hub shell 16, as shown in FIG. 3. The first bearing unit 17 comprises a first ball bearing member 17a mounted in a non-rotatable manner to the right main body part 16b, a first ball pushing member 17b screwed onto the external threads 15a of the hub shaft 15, and a plurality of spherical bodies 17c arranged between the first ball bearing member 17a and the first ball pushing member 17b. The first ball pushing member 17b is arranged inside the drive body 19 and a first seal member 24 is arranged between the radially inward-facing surface of the drive body 19 and the first ball pushing member 17b to seal the gap there-between. The first seal member 24 is a generally disk-shaped elastic body made of nitrile rubber or the like. The first seal member 24 is mounted to the radially outward-facing surface of the first ball pushing member 17b and its tip edge contacts the radially inward-facing surface of the drive body 19.

As shown in FIG. 2, the second bearing unit 18 comprises a second ball bearing member 18a mounted in a non-rotatable manner to the left main body part 16a, a second ball pushing member 18b screwed onto the external threads 15a of the hub shaft 15, and a plurality of spherical bodies 18c arranged between the second ball bearing member 18a and the second ball pushing member 18b. A second seal member 25 is installed between the second ball pushing member 18b and the end face of the left main body part 16a to seal the gap there-between. The second seal member 25 is also an elastic body made of nitrile rubber or the like.

Figure 4:
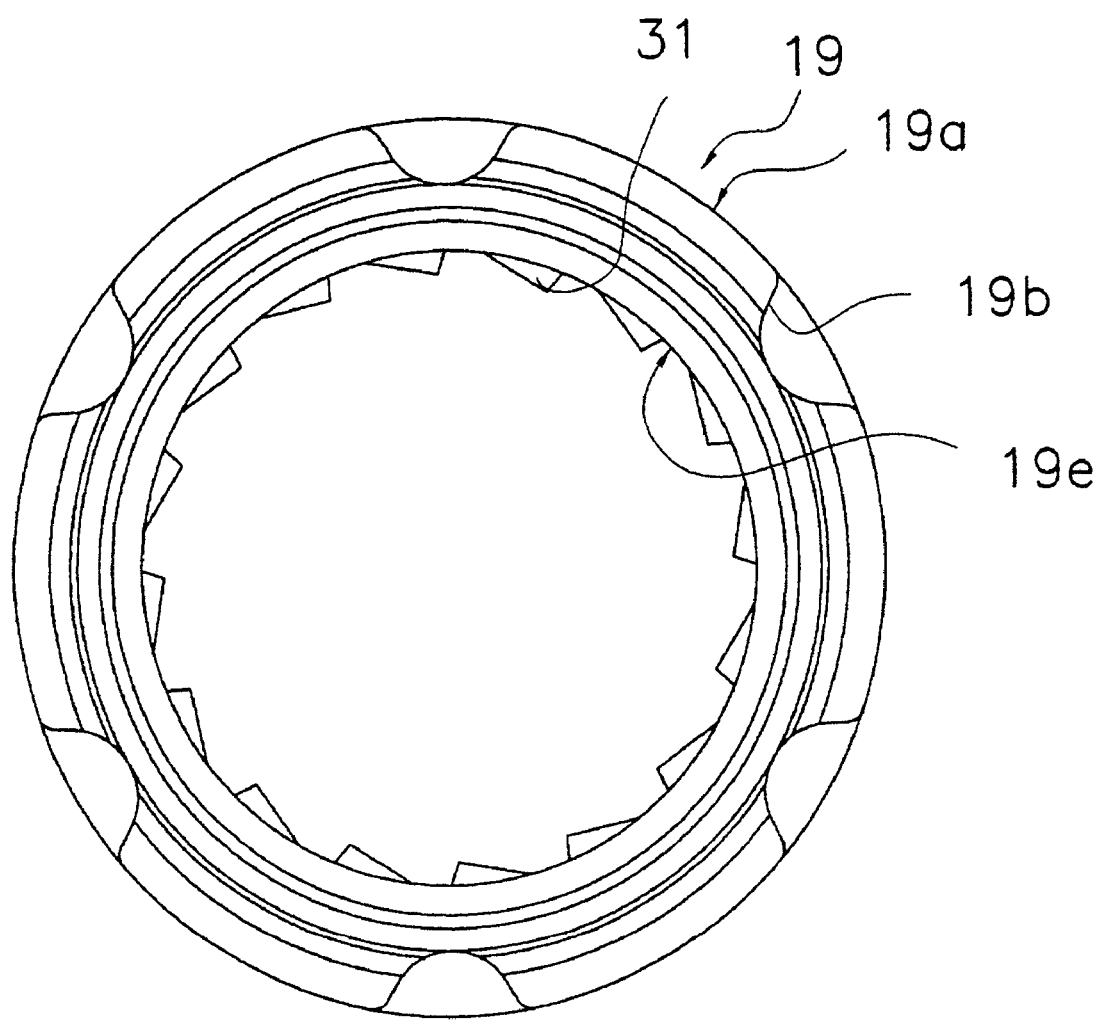
FIG. 4 is a cross sectional view of the rear hub illustrated in FIGS. 2 and 3 as seen along section line IV—IV of FIG. 3.

As shown in FIGS. 3 and 4, the drive body 19 is a generally cylindrical member made of, for example, carbon steel. In the radially outward-facing surface 19a thereof are provided six interlock grooves 19b that are spaced apart in the circumferential direction and extend in the axial direction of the hub shaft and first and second annular grooves 19c, 19d that are separated by a prescribed spacing in the axial direction.

The interlock grooves 19b are so formed as to have the shape of a semicircular arc in a cross sectional view. The sprocket 21 interlocks with the interlock grooves 19b such that it cannot rotate. An annular contact surface 19f against which the sprocket 21 abuts is provided on the axially inside portion of the radially outward-facing surface 19a where the interlock grooves 19b are formed. The sprocket 21 is positioned by the annular contact surface 19f.

The first annular groove 19c is for mounting the ring-shaped spring member 26 and is formed to a depth of approximately one half of the diameter of the wire used to make the spring member 26. When the sprocket 21 is mounted such that it contacts the annular contact surface 19f and the spring member 26 is installed in the first annular groove 19c, the axial movement of the sprocket 21 is restricted. The spring member 26 is made of elastic metal wire material curved in to a C-shape. The second annular groove 19d is for interlocking the cover member 23. The drive body 19 is supported in a freely rotatable manner on the hub shell 16 by using a third bearing unit 27.

The third bearing unit 27 comprises a pair of ball bearing surfaces 27a formed in the radially inward-facing surface of the drive body 19, a pair of ball pushing surfaces 27b formed in the first ball bearing member 17a and the radially outward-facing surface of the left main body part 16b, and a plurality of spherical bodies 27c arranged between the ball bearing surfaces 27a and the ball pushing surfaces 27b. A third seal member 28 installed in the gap between the left main body part 16b and the radially inward-facing surface of the left end of the drive body 19. The first and third seal members 24 and 28 prevent contaminants from reaching the inside of the drive body 19.

The one-way clutch 20 comprises a ratchet claws 30 that are mounted on the right main body part 16b such that they can rise and fall freely, saw-tooth-shaped ratchet teeth 31 that can interlock with the tip ends of the ratchet claws 30, and force applying members 32 that apply forces to the ratchet claws 30 in such a direction as to make the ratchet claws 30 rise. The one-way clutch 20 is configured to transmit rotation from the drive body 19 to the right main body part 16b of the hub shell 16 only in the direction of forward advancement of the bicycle and not in the opposite direction.

The sprocket 21 engages with the chain along its outside circumference and is rotated by the chain when the crank rotates. Six interlock projections 21a for interlocking with the interlock grooves 19b are provided on the radially inward-facing surface of the sprocket 21. Movement of the sprocket 21 in the axial direction is restricted by the spring member 26.

Figure 5:
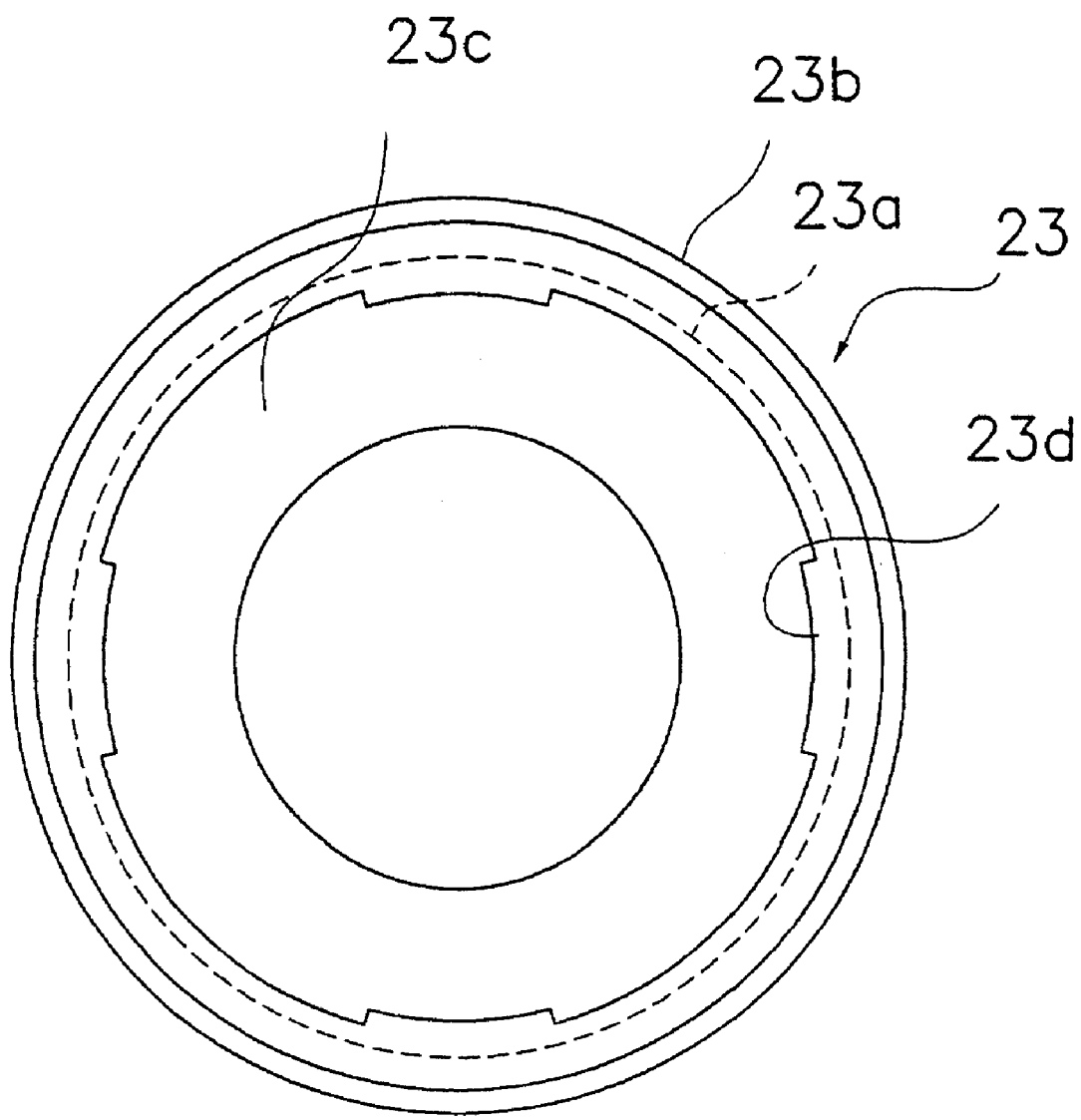
FIG. 5 is a cross sectional view of the rear hub illustrated in FIGS. 2–4 as seen along section line V—V of FIG. 3.

As shown in FIGS. 3 and 5, the cover member 23 is generally shaped like a cylinder having a bottom and is made of a synthetic resin, such as polyethylene. The cover member 23 has a cylindrical part 23a that covers the radially outward-facing surface 19a of the drive body 19, an enlarged diameter part 23b that expands from the tip edge of the cylindrical part 23a and contacts the outside lateral surface of the sprocket 21 with its tip edge, and a flange part 23c that extends radially inward from the base end of the cylindrical part 23a.

The cylindrical part 23a has a radially inward-facing surface that almost contacts the radially outward-facing surface 19a of the drive body 19. Four interlock projections 23d that project radially inward are provided on the radially inward-facing surface of the cylindrical part 23a and serve to interlock elastically with the second annular groove 19d. The radially outward-facing surface of the cylindrical part 23a tapers toward the end part. The enlarged diameter part 23b is curved convexly toward the outside from the tip edge of the cylindrical part 23a. The curved tip edge contacts the outside lateral surface of the sprocket 21. The spring member 26 is a split ring that is disposed radially inward of the enlarged diameter part 23b. Thus, since the spring member 26 is arranged in a substantially sealed space, the spring member 26 will not easily become rusted even if it is made of a comparatively inexpensive and non-corrosion resistant steel material instead of stainless steel. The flange part 23c projects radially inward slightly beyond the radially inward-facing surface of the drive body 19. As a result, there is a section where the flange part 23c overlaps with the first seal member 24 installed between the first ball pushing member 17b and the radially inward-facing surface of the drive body 19 and can serve to protect the first seal member 24.

With a rear hub 10 thus configured, when the crank is rotated in the direction of forward advancement, the chain rotates the sprocket 21 in the direction of forward advancement and the drive body 19 transmits that rotation to the hub shell 16 through the one-way clutch 20, thereby rotating the rear wheel 107. The cover member 23 is mounted around the outside of the drive member 19 of the rear hub 10. Thus, even if water is splashed about when the bicycle is ridden, the liquid will not stick to the radially outward-facing surface of the drive body and will not easily reach the internal components. As a result, corrosion of the drive member 19 can be prevented and the external appearance of the drive member 19 can be improved.

OTHER EMBODIMENT

Although a flange part 23c is provided on the cover member 23 in the previously described embodiment, it is also acceptable not to provide a flange part 23c. Although the sprocket 21 is prevented from rotating by interlocking with interlock grooves, it is also acceptable to fasten the spring 21 with a screw As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Also the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-038284. The entire disclosure of Japanese Patent Application No. 2003-038284 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear hub comprising:
   a hub shaft configured and arranged to be non-rotatably mounted to a rear part of a bicycle frame;
   a hub shell rotatably mounted on the hub shaft;
   first and second bearing units arranged between the hub shaft and opposite ends of the hub shell;
   a drive body rotatably mounted to one end of the hub shell;
   a one-way clutch arranged between the drive body and the hub shell, the one-way clutch being configured to transmit rotation from the drive body to the hub shell in one direction;
   a sprocket fixedly mounted to a radially outward-facing surface of the drive body such that it neither rotates nor moves axially relative to the drive body; and
   a cover member mounted to the drive body to overlie the radially outward-facing surface of the drive body with a tip edge of the cover member contacting an outside lateral surface of the sprocket.

2. The bicycle rear hub as recited in claim 1, wherein the cover member has a cylindrical part covering the radially outward-facing surface of the drive body and an enlarged diameter part extending from the cylindrical part to contact the sprocket with the tip edge of the cover member.

3. The bicycle rear hub as recited in claim 2, wherein the sprocket is retained on the radially outward-facing surface of the drive body by a ring-shaped spring member that restricts axial movement of the sprocket; and
   the enlarged diameter part of the cover member is configured and arranged to cover a radially outward-facing side of the spring member.

4. The bicycle rear hub as recited in claim 3, wherein the first bearing unit has a first ball pushing member fastened to the hub shaft by screw threads, a first ball bearing member mounted in a non-rotatable manner to one end of the hub shell, and a plurality of spherical bodies arranged between the first ball pushing member and the first ball bearing member; and further comprising
   a seal member disposed to seal a gap formed between a radially inward-facing surface of the drive body and a radially outward-facing surface of the first ball pushing member of the first bearing unit.

5. The bicycle rear hub as recited in claim 4, wherein the cover member is further provided with a flange part that extends radially inward from a base end of the cylindrical part such that the flange part overlies the seal as viewed in an axial direction along the hub shaft.

6. The bicycle rear hub as recited in claim 5, wherein the cover member is elastically interlocked with the radially outward-facing surface of the drive body.

7. The bicycle rear hub as recited in claim 6, wherein the drive body includes an annular depression formed in the radially outward-facing surface of the drive body; and
   the cover member includes a mating protrusion extending radially inward and meshing with the annular depression to elastically interlock the cover member with the radially outward-facing surface of the drive body.

8. The bicycle rear hub as recited in claim 1, wherein
the sprocket is retained on the radially outward-facing surface of the drive body by a ring-shaped spring member that restricts axial movement of the sprocket; and
the cover member is configured and arranged to cover a radially outward-facing side of the spring member.

9. The bicycle rear hub as recited in claim 1, wherein
the first bearing unit has a first ball pushing member fastened to the hub shaft by screw threads, a first ball bearing member mounted in a non-rotatable manner to one end of the hub shell, and a plurality of spherical bodies arranged between the first ball pushing member and the first ball bearing member; and further comprising
a seal member disposed to seal a gap formed between a radially inward-facing surface of the drive body and a radially outward-facing surface of the first ball pushing member of the first bearing unit.

10. The bicycle rear hub as recited in claim 2, wherein
the cover member is further provided with a flange part that extends radially inward from a base end of the cylindrical part.

11. The bicycle rear hub as recited in claim 10, wherein
the sprocket is retained on the radially outward-facing surface of the drive body by a ring-shaped spring member that restricts axial movement of the sprocket; and
the enlarged diameter part of the cover member is configured and arranged to cover a radially outward-facing side of the spring member.

12. The bicycle rear hub as recited in claim 11, wherein
the cover member is elastically interlocked with the radially outward-facing surface of the drive body.

13. The bicycle rear hub as recited in claim 12, wherein
the drive body includes an annular depression formed in the radially outward-facing surface of the drive body; and
the cover member includes a mating protrusion extending radially inward and meshing with the annular depression to elastically interlock the cover member with the radially outward-facing surface of the drive body.

14. The bicycle rear hub as recited in claim 10, wherein
the cover member is elastically interlocked with the radially outward-facing surface of the drive body.

15. The bicycle rear hub as recited in claim 14, wherein
the drive body includes an annular depression formed in the radially outward-facing surface of the drive body; and
the cover member includes a mating protrusion extending radially inward and meshing with the annular depression to elastically interlock the cover member with the radially outward-facing surface of the drive body.

16. The bicycle rear hub as recited in claim 1, wherein
the cover member is elastically interlocked with the radially outward-facing surface of the drive body.

17. The bicycle rear hub as recited in claim 16, wherein
the drive body includes an annular depression formed in the radially outward-facing surface of the drive body; and
the cover member includes a mating protrusion extending radially inward and meshing with the annular depression to elastically interlock the cover member with the radially outward-facing surface of the drive body.

18. The bicycle rear hub as recited in claim 1, wherein
the cover member is a one-piece, unitary member that is constructed of an elastomeric material.

19. The bicycle rear hub as recited in claim 18, wherein
the cover member includes a cylindrical part covering the radially outward-facing surface of the drive body, an enlarged diameter part extending from an inner end of the cylindrical part to contact the sprocket with the tip edge of the cover member and a flange part extending radially inward from a outer end of the cylindrical part.

20. The bicycle rear hub as recited in claim 19, wherein
the drive body includes an annular depression formed in the radially outward-facing surface of the drive body; and
the cylindrical part of the cover member includes a mating protrusion extending radially inward and meshing with the annular depression to elastically interlock the cover member with the radially outward-facing surface of the drive body.

* * * * *